United States Patent [19]

Folcher et al.

[11] 4,391,881

[45] Jul. 5, 1983

[54] PHOTOGALVANIC CELL

[75] Inventors: Gerard Folcher, Orsay; Jacques Paris, Bures sur Yvette, both of France

[73] Assignee: Commissariat a l'Energie Atomique, Paris, France

[21] Appl. No.: 274,462

[22] Filed: Jun. 17, 1981

[30] Foreign Application Priority Data

Jun. 18, 1980 [FR] France ................ 80 13543

[51] Int. Cl.³ .......................................... H01M 6/36
[52] U.S. Cl. ................................................ 429/111
[58] Field of Search ..................................... 429/111

[56] References Cited

U.S. PATENT DOCUMENTS 3,255,044 6/1966 Powers et al. ........................ 429/5
3,255,046 6/1966 Ghormley ............................ 429/5

OTHER PUBLICATIONS

W. J. Albery et al., "Photogalvanic Cells-I. The Potential of Zero Current", *Electrochimica Acta*, vol. 21, pp. 1155-1163, (1976), *Chem. Revs.*, vol. 31, (1942), pp. 187, 220.

*Primary Examiner*—Aaron Weisstuch

[57] ABSTRACT

The photogalvanic cell is particularly intended for converting solar energy into electrical energy.

The photogalvanic cell comprises two electrodes in a liquid system comprising a photosensitive constituent, which is formed by the uranyl ion $UO_2^{2+}$. The liquid system comprises a second constituent which is a cation and more particularly $Ce^{3+}$. The second constituent can also be an anion and in particular $NO_3^-$ or $SCN^-$. One of the electrodes is of polished platinum and the other of a chemically inert conductive substance, particularly graphite.

The photogalvanic cell can also be coupled to a photovoltaic cell.

8 Claims, 5 Drawing Figures

PHOTOGALVANIC CELL

BACKGROUND OF THE INVENTION

The present invention relates to a photogalvanic cell, which is in particular usable for converting solar energy into electrical energy.

For a number of years research has been carried out in connection with devices making it possible to recover solar energy in the form of thermal or electrical energy. As a result of this research photogalvanic cells have been developed which make it possible to convert light energy from the sun into an electromotive force. These cells comprise two electrodes placed in a liquid containing one or more redox systems, including a photosensitive type constituted, for example, by a dye or stain such as thionine. In these cells one of the electrodes is illuminated by a light beam, whilst the other electrode remains in the dark. The absorption of the visible radiation by the photosensitive type makes it possible to produce redox reactions in the liquid, which give rise to the appearance of a potential difference at the electrodes of the cell. As a result they can supply electrical current without consuming the various constituents of the liquid or the electrodes. When the photosensitive type is thionine, the liquid conventionally contains a redox relay system constituted either by $Fe^{2+}/Fe^{3+}$, or by an organic constituent such as hydroquinone.

However, such cells do not make it possible to obtain satisfactory conversion efficiencies. Thus, the voltages obtained are generally below 300 mV and the power levels obtained are at the most a few dozen $\mu$watts/cm$^2$. Moreover, when the relay system is in an organic constituent the liquid loses it stability after a few minutes. Conversely, with relay systems constituted by $Fe^{2+}/Fe^{3+}$ good stability is obtained, but then the power of the cell does not exceed 1 $\mu$W/cm$^2$.

BRIEF SUMMARY OF THE INVENTION

The object of the present invention is a photogalvanic cell having improved properties as compared with the presently known cells.

The photogalvanic cell according to the invention comprises two electrodes arranged in a liquid system having a photosensitive constituent and is characterized in that the latter is the uranyl ion $UO_2^{2+}$.

As a result of the use of this uranyl ion the photogalvanic cell according to the invention has in particular the advantage of leading to better conversion efficiencies. Thus, when the uranyl ion $UO_2^{2+}$ is brought into an excited state by the absorption of a photon, it is transformed into a highly oxidizing type $UO_2^{2+*}$, which can then be reduced to $UO_2^+$. The energy which is potentially trapped by the uranyl ion during this transformation is 2.6 eV, which is a significant energy level which can then be recovered electrochemically with good conversion efficiencies. Thus, compared with $UO_2^{2+}/UO_2^+$, whose redox potential is 0.06 V relative to the standard hydrogen electrode (SHE), $UO_2^{2+*}/UO_2^+$ has a much higher redox potential, which is approximately 2.6 V relative to SHE.

Moreover, the uranyl ion $UO_2^{2+}$ is able to absorb in the range of wavelengths of the solar spectrum, making it advantageous for use in photogalvanic cells for transforming solar energy into electric power. Finally, it has a better stability to light than most of the hitherto used dyes.

According to the invention the highly oxidizing properties of the ion $UO_2^{2+*}$ are used for producing an energy-storing oxidized type $A_{ox}$ in the liquid system.

According to the invention, the liquid system advantageously comprises a second constituent $A_{red}$ able to reduce the uranyl ion $UO_2^{2+*}$ and which can be converted into the oxidized type $A_{ox}$, i.e. a constituent $A_{red}$, whose redox potential of $A_{red}/A_{ox}$ is below 2.6 V relative to SHE.

In this case it is assumed that the operation of the cells corresponds to the following reactions:

(a) in the liquid system illuminated by the light beam

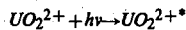
$$UO_2^{2+} + h\nu \rightarrow UO_2^{2+*}$$

$$UO_2^{2+*} + A_{red} \rightarrow UO_2^+ + A_{ox}$$

(b) on the illuminated electrode

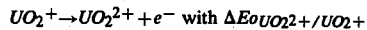
$$UO_2^+ \rightarrow UO_2^{2+} + e^- \quad \text{with} \quad \Delta E_{o\,UO_2^{2+}/UO_2^+}$$

(c) on the other illuminated or non-illuminated electrode

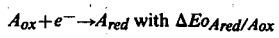
$$A_{ox} + e^- \rightarrow A_{red} \quad \text{with} \quad \Delta E_{o\,A_{red}/A_{ox}}$$

this leading to a potential difference between the electrodes if

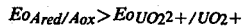
$$E_{o\,A_{red}/A_{ox}} > E_{o\,UO_2^{2+}/UO_2^+}$$

In this system the energy trapped by the light is 2.6 eV and the theoretical losses are calculated on the basis of the difference:

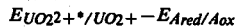
$$E_{UO_2^{2+*}/UO_2^+} - E_{A_{red}/A_{ox}}$$

Thus, it is advantageous to choose as the second constituent $A_{red}$ one in which the redox potential of $A_{red}/A_{ox}$ is as close as possible to the oxidoreduction potential of $UO_2^{2+*}/UO_2^+$, i.e. 2.6 V relative to SHE.

Preferably the second constituent $A_{red}$ is such that the redox potential of $A_{red}/A_{ox}$ exceeds 1 V.

Moreover, it is necessary that the second constituent $A_{red}$ is such that the oxidized type $A_{ox}$ does not rapidly react with the other constituents of the liquid system and in particular the solvent or that it reacts to give a still very highly oxidizing type preferably having a redox potential exceeding 1 V relative to SHE. According to the invention the second constituent $A_{red}$ can be a cation or an anion.

Among the cations which can be used, reference is made to the ion $Ce^{3+}$ which has satisfactory properties because the redox potential of $Ce^{3+}/Ce^{4+}$ is 1.7 V relative to the standard hydrogen electrode. It is also possible to use $Fe^{2+}$ which is very stable, but is of less interest because the redox potential of $Fe^{2+}/Fe^{3+}$ is only 0.6 V. When the second constituent is a cation the uranyl ion is introduced into the ligand system in the form of complexes containing ligands fixed by Lewis-type bonds, such as pyridine, phenanthroline and dicyanoethane. Advantageously the complex used is $UO_2(NO_3)_2$ bipyridyl.

When the second constituent $A_{red}$ is constituted by an anion it must be possible for the latter to be bonded to the uranyl ion and must produce by oxidation a radical $A_{ox}$, which can either discharge directly on one of the electrodes or reacts in the liquid system to give a type which is able to discharge on one of the electrodes. Anions which can be used are $NO_3^-$, $SCN^-$, $Cl^-$, $Br^-$ and $I^-$.

When the second constituent is constituted by an anion which is transformed by oxidation into a radical able to react with a third constituent of the liquid system to give a type which can discharge on the electrode, it is also necessary for said radical to have an adequate life to enable it to react with the third constituent. In the same way when the second constituent is constituted by a cation or by an anion is transformed by oxidation into an oxidized cation or a radical able to discharge directly on the electrode, it is necessary for said radical or said oxidized cation to have an adequate life to enable it to reach the electrode or for it to be transformed into a relatively stable type enabling it to reach the electrode.

Advantageously the liquid system comprises water and the second constituent is an anion which can be bonded to the uranyl ion and can be converted by oxidation into a radical able to react in the liquid system to form hydrogen peroxide.

According to the invention, the liquid system comprises a solvent in which the first and second constituents are dissolved. This solvent must be as inert as possible and in particular must not react with the ion $UO_2^+$ and with the second constituent $A_{red}$, which would lead to the formation of new products prejudicial to bringing about the reversibility of the system. Thus, when using the anion $NO_3^-$ and the second constituent water alone cannot be used as the solvent. Acetonitrile is a solvent which can be used.

In the case of a liquid system having as the second constituent the anion $SCN^-$ it is possible to use dimethyl sulphoxide as the solvent, provided that a small amount of water is added to it and the temperature is raised by 20° C. compared with the initial starting temperature in order to obtain an appropriate viscosity.

In certain cases the charge transfer to the electrodes can be improved by adding to the solvent an ion transporting medium, e.g. a tetraalkyl ammonium perchlorate such as tetraethyl ammonium perchlorate. Other additives can be added to the solvent e.g. chloroform for improving the light stability of liquid systems in which the second constituent is an anion, e.g. the liquid system constituted by uranyl nitrate dissolved in acetonitrile.

It has been found that when a solution of 0.2 M uranyl nitrate in acetonitrile in a sealed cell is left exposed to the light after a few hours a precipitate is formed which can be redissolved by adding a mineral acid. However, this acid addition is prejudicial to obtaining a satisfactory operation of the photogalvanic cell. However, if chloroform is added beforehand to the solvent, e.g. at a rate of 0.1 cm³ for 5 cm³ of solution, the aforementioned precipitate is not formed and in this way a satisfactory operation of the cell can be obtained.

In all cases it is preferable to limit the water content of the liquid system in order to obviate parasitic reactions. However, in systems where the second constituent is an anion bonded to the uranyl, the water content must be close to that used as the constitution water for the uranyl nitrate.

According to the invention, importance is also attached to the choice of electrodes for the cell. Thus, to obtain a satisfactory operation it is necessary for the electrodes to be reversible, to ensure electronic transfers with a maximum rapidity, that they are chemically inactive, have a minimum overvoltage and a minimum ohmic resistance. They can be made from precious metals, for example polished platinum in the case of the illuminated electrode. A chemically inert conductive substance, such as a conductive oxide, graphite or a precious metal can be used for the other electrode. When said other electrode is made from a precious metal it must not receive light, which can be brought about by placing it in the shadow of the illuminated electrode. Advantageously the illuminated electrode is of polished platinum and the other electrode, which may or may not be illuminated is of porous graphite, which makes it possible to increase the surface of said electrode and raise the limiting current value. Thus, it has been found that a 30% increase of the microscopic porosity of the graphite electrode makes it possible to double the efficiency of the cell.

In the cell according to the invention an important parameter is the thickness of the liquid medium in front of the illuminated electrode, because it is this which determines the efficiency of the cell. The determination of the optimum thickness is dependent on a number of elements. It must make it possible to obtain a maximum energy absorption. However, there are several factors which favor a limited thickness. The reduced type $UO_2^+$ must be reoxidized as quickly as possible prior to redox reaction which would lead to the formation of U(IV). In addition, the nature of the radicals formed is such that their accumulation in a limited area is indispensable to the satisfactory operation of the cell.

In each case the optimum thickness must be defined as a function of the intensity of the light flux, the uranyl concentration and the operating temperature.

With a $UO_2^{2+}$ concentration of $0.2$ M.$l^{-1}$ a light flux from a 500 watt lamp, an operating temperature of approximately 45° C., a solution volume of 30 cm³, a polished platinum illuminated electrode surface of 10 cm² and a commercial porous graphite electrode a thickness of 0.1 to 0.5 mm can be used.

BRIEF DESCRIPTION OF THE DRAWINGS

The invention is described in greater detail hereinafter relative to non-limitative embodiments and with reference to the attached drawings, wherein.

DETAILED DESCRIPTION OF THE PREFERRED EMBODIMENTS

Figure 1:
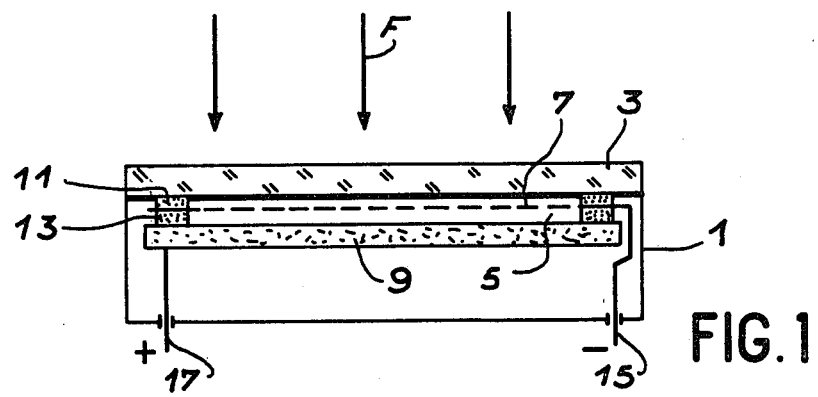
FIG. 1 is a vertical section through a photogalvanic cell according to the invention.

It is possible to see from FIG. 1 that the cell according to the invention comprises a tightly sealed case or box 1, whose upper wall 3 is made from a transparent material, e.g. glass. This case or box is filled with a liquid system 5 containing two electrodes 7 and 9 fitted in parallel to the entry face of the light beam (diagrammatically indicated by arrows F) and maintained in place by two sets of insulating shims 11 and 13. Consequently in this cell the electrodes are arranged in such a way that electrode 9 is in the shadow of electrode 7. Electrode 7 is made from polished platinum and is perforated by holes in such a way that it permits the passage of oxidized types and it is maintained at a predetermined distance from the upper wall 3 of the cell by the set of shims 11. Electrode 9 is made from graphite, like that used for commercial batteries. Outputs 15 and 17 respectively connected to electrodes 7 and 9 sealingly traverse case 1 so as to make it possible to recover the electrical power produced in the cell under the effect of the light beam. The following Examples illustrate the results obtained with different liquid systems.

EXAMPLE 1

In this example the liquid system is constituted by acetonitrile into which has been introduced a complex of $UO_2(NO_3)_2$ bipiridyl with a concentration of 0.1 $M.1^{-1}$ and cerium III at a concentration of 0.1 $M.1^{-1}$. It is pointed out that the cerium III is obtained by etching a metal cerium bar by means of a 12 N hydrochloric acid solution. Moreover, the pH-value of the liquid system is adjusted by adding hydrochloric acid in such a way that the constituents are soluble.

Figure 2:
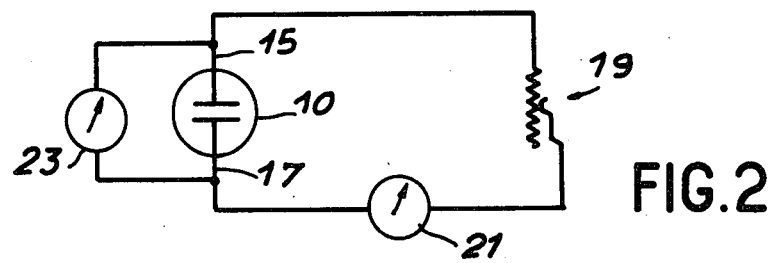
FIG. 2 is a diagrammatic view of an arrangement for measuring the power and efficiency of a cell according to the invention.

The results obtained with a cell containing this liquid system are checked by using the device diagrammatically shown in FIG. 2 in which the electrical outputs 15 and 17 of cell 10 are connected to a variable resistor 19 and to an ammeter 21. The device also comprises a voltmeter 23 fitted between the terminals of the cell in order to measure the voltage supplied by the latter when it is illuminated by a light beam.

Figure 3:
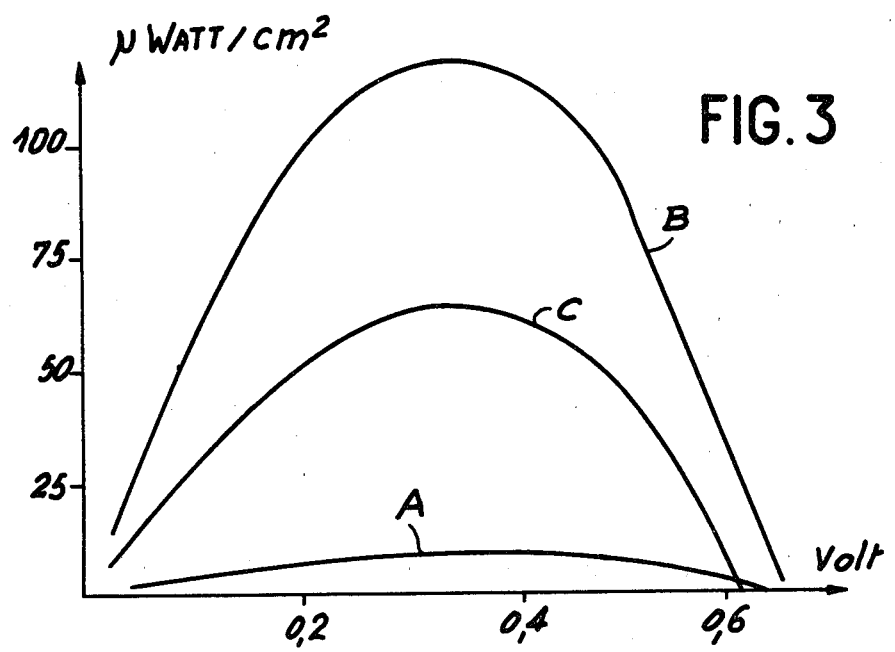
FIG. 3 is a graph showing the variations in the power supplied by different cells according to the invention, as a function of the voltage supplied by these cells.

The results obtained with this cell are given on curve A of FIG. 3 showing the variations in the power supplied by the cell (in microwatt/cm$^2$) as a function of the voltage (in volts) at the terminals of the cell. It can be seen that the power supplied by the cell is low, but is already comparable with that which can be obtained with known cells using, for example, the ferrous iron-thionine system as the liquid system.

EXAMPLE 2

In this example the liquid system is constituted by a molar solution $1.5 \times 10^{-1}$ of $UO_2(NO_3)_2.6H_2O$ in acetonitrile with a liquid thickness of less than 0.5 mm between electrode 5 and the upper glass wall 3 of the cell. The results obtained with this cell are checked by using the arrangement shown in FIG. 2. The results obtained are illustrated on curve B of FIG. 3, which shows that the power levels obtained exceed those of example 1. Thus, it is possible to obtain a maximum power of approximately 120 $\mu W/cm^2$ for a voltage of approximately 0.4 V. In FIG. 3 curve C illustrates the results obtained with this cell when the liquid system has a uranyl nitrate concentration of 0.075 $M.1^{-1}$. Moreover, it has been found that this liquid system is stable for several dozen hours in a 10% range, i.e. the average voltage fluctuates by ±5%. However, this stability can be improved by adding 0.1 cm$^3$ of chloroform for every 5 cm$^3$ of solution. In addition, the apparent quantum efficiency R of this cell is measured. This is expressed by the ratio between the power supplied to the cell (in $\mu Watt/cm^2$) and the power supplied by the latter (in $\mu Watt/cm^2$) as a function of the wavelength by using either a lower power filament lamp (300 W) or a mercury vapor U.V. lamp with a power of 1000 W. In both cases the light emitted by the lamp traverses a monochromator for releasing the spectrum and is then transmitted to the platinum electrode 7.

Figure 4:
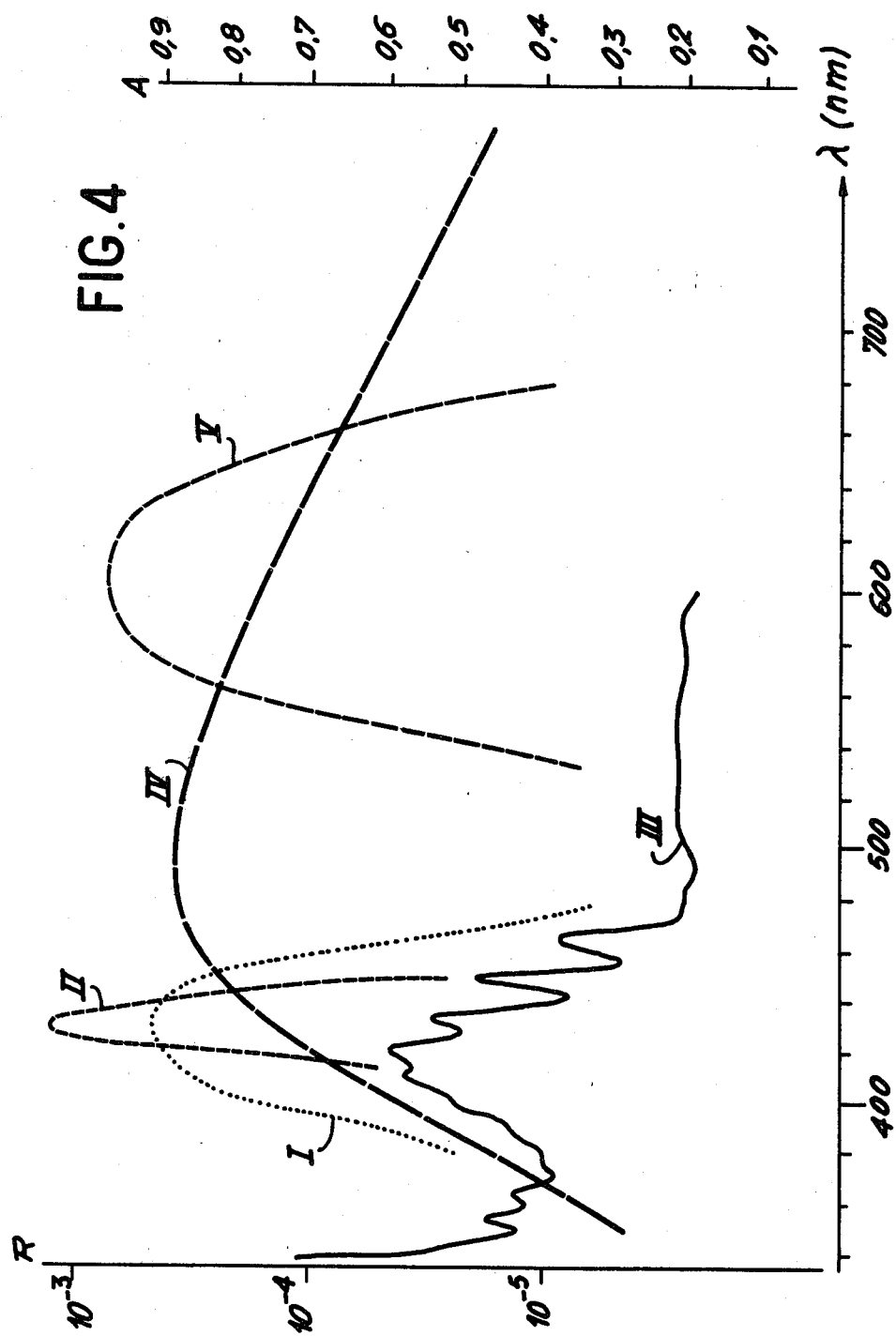
FIG. 4 is a graph showing the quantum efficiency variations R of a cell according to the invention as a function of the wavelength λ and the incident light beam power (curves I and II), the absorption spectrum of a uranyl nitrate solution (curve III), the solar spectrum (curve IV) and the quantum efficiency variations of a silicon photovoltaic cell as a function of the wavelength (curve V).

The results obtained are given in FIG. 4, which shows the apparent quantum efficiency R as a function of the wavelength $\lambda$ (in nanometers) of the incident light beam. In this graph curve I illustrates the results obtained with the filament lamp and curve II those obtained with the mercury vapour lamp. FIG. 4 also shows the absorption spectrum (curve III) of the uranyl nitrate solution with the absorptivity A as a function of the wavelength.

It can be gathered from FIG. 4 that the apparent quantum efficiency is highest for wavelengths between 400 and 450 nanometers, which shows that it is the light absorbed by the ion $UO_2^{2+}$ in the region 400 to 450 nanometers of the spectrum which is transformed into electrical power.

Figure 5:
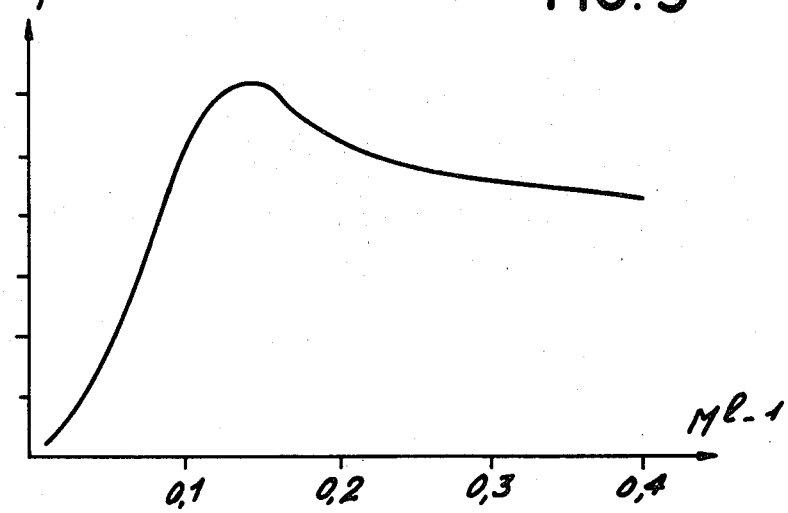
FIG. 5 is a graph showing the variations in the power supplied by the cell according to the invention as a function of the uranyl concentration of the liquid system.

The influence of the uranyl nitrate concentration of the liquid system has also been studied by measuring the power supplied by the cell as a function of the uranyl concentration of the liquid system. The results obtained are given in FIG. 5, which shows the variations in the power supplied by the cell (in $\mu Watt/cm^2$) as a function of the uranyl concentration (in $M.1^{-1}$).

It is apparent from FIG. 4 that the power increases substantially linearly up to 0.1 $M.1^{-1}$ and that it passes through a maximum and then becomes approximately constant at about 0.5 $M.1^{-1}$.

Finally, the potentials of the electrodes of this cell compared with the Plestkov electrode are measured independently in the presence of illumination and on the basis thereof it can be assumed that the operating mechanism of this cell is as follows:

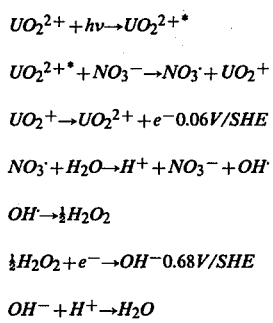

The photogalvanic cells according to the invention consequently have better performance levels than the known cells. Thus, the voltages supplied can be 500 millivolts, whereas they are generally below 300 millivolts with the known cells. Furthermore, the power levels supplied can be about 100 microwatts/cm$^2$, whereas they are limited to a few dozen microwatts/cm$^2$ with the known cells.

However, for the use of these cells with solar energy it would appear from FIG. 4, in which curve IV represents the solar spectrum, that the uranyl spectrum only partly covers the solar spectrum (between 10 and 20%). Therefore the photogalvanic cells according to the invention do not permit an optimum utilization of solar energy.

Thus, in order to improve the solar energy utilization level it is advantageous to connect the photogalvanic cell according to the invention to a photovoltaic cell, such as a silicon cell.

Thus, on referring to FIG. 4 in which curve V represents the quantum efficiency of a silicon photovoltaic cell as a function of the wavelength, it can be seen that these cells are sensitive to the wavelengths where the uranyl ion is transparent (curve III).

Figure 6:
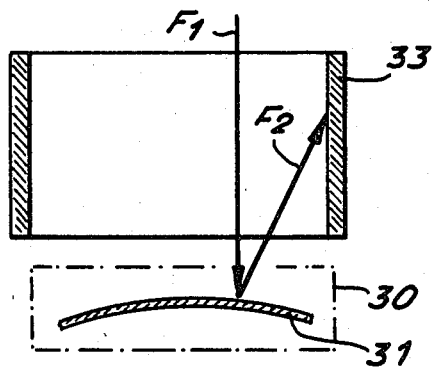
FIG. 6 is the coupling of a photogalvanic cell according to the invention with a photovoltaic cell.

FIG. 6 illustrates the coupling of a photogalvanic cell according to the invention to a photovoltaic cell. It can be seen that the photogalvanic cell 30 comprises a slightly concave platinum electrode 31. Thus, the light rays ($F_1$) not absorbed by the uranyl of the liquid system of the photogalvanic cell are reflected by electrode 31 and these reflected rays $F_2$ can be used in the tubular silicon photovoltaic cell 33 for producing electrical power. The electrical connection between the photogalvanic cell and the photovoltaic cell can either be in parallel or in series, as a function of requirements. Thus, considerable significance is attached to the coupling of a photogalvanic cell to a photovoltaic cell, because it makes it possible to use virtually all the energy of the solar spectrum.

What is claimed is:

1. A photogalvanic cell comprising two electrodes arranged in a liquid system comprising a first photosensitive constituent, consisting of the uranyl ion $UO_2{}^{2+}$ and a second constituent $A_{red}$ able to reduce the uranyl ion $UO_2{}^{2+}$ when the latter is brought into an excited state $UO_2{}^{2+*}$ by the absorption of a photon and which can be transformed into an oxidized type $A_{ox}$, the second constitutent $A_{red}$ being such that the redox potential of $A_{red}/A_{ox}$ is below 2.6 V relative to the standard hydrogen electrode (SHE) wherein the second constituent is a cation having a redox potential higher than 1 V relative to the standard hydrogen electrode or an anion selected from the group consisting of $NO_3{}^-$ and $SCN^-$, and the liquid system comprises a solvent inert with respect to $UO_2{}^+$ and $A_{red}$.

2. A cell according to claim 1, wherein the cation is $Ce^{3+}$.

3. A cell according to claim 1, wherein one of the electrodes is of polished platinum and the other electrode is of a chemically inert conductive substance.

4. A cell according to claim 1, wherein one of the electrodes is of polished platinum and the other electrode is of graphite.

5. A cell according to claim 1, wherein the liquid system is constituted by a solution of uranyl nitrate $UO_2(NO_3)_2.6H_2O$ in acetonitrile.

6. A cell according to claim 5, wherein the solution of uranyl nitrate in acetonitrile contains chloroform.

7. A cell according to claim 1, wherein the liquid system is constituted by a solution in acetonitrile of a complex of uranyl and $Ce^{3+}$ ions.

8. A cell according to claim 7, wherein the uranyl complex is $UO_2(NO_3)_2$ bipiridyl.

* * * * *